(12) United States Patent
Kitamura et al.

(10) Patent No.: US 9,682,892 B2
(45) Date of Patent: Jun. 20, 2017

(54) POWDER FOR THERMAL SPRAYING, THERMAL SPRAYED COATING, AND METHOD FOR FORMING THERMAL SPRAYED COATING

(71) Applicant: FUJIMI INCORPORATED, Kiyosu-shi, Aichi (JP)

(72) Inventors: Junya Kitamura, Kiyosu (JP); Kazuto Sato, Kiyosu (JP); Kazuyuki Tsuzuki, Kiyosu (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 14/774,061

(22) PCT Filed: Mar. 7, 2014

(86) PCT No.: PCT/JP2014/055936
§ 371 (c)(1),
(2) Date: Sep. 9, 2015

(87) PCT Pub. No.: WO2014/142019
PCT Pub. Date: Sep. 18, 2014

(65) Prior Publication Data
US 2016/0016856 A1 Jan. 21, 2016

(30) Foreign Application Priority Data

Mar. 13, 2013 (JP) ................................. 2013-050863

(51) Int. Cl.
| | | |
|---|---|---|
| C23C 4/11 | (2016.01) | |
| C04B 35/622 | (2006.01) | |
| C04B 35/66 | (2006.01) | |
| C04B 35/626 | (2006.01) | |
| C04B 35/628 | (2006.01) | |
| C23C 4/10 | (2016.01) | |
| C23C 4/12 | (2016.01) | |

(52) U.S. Cl.
CPC ...... *C04B 35/62222* (2013.01); *C04B 35/626* (2013.01); *C04B 35/628* (2013.01); *C04B 35/62892* (2013.01); *C04B 35/66* (2013.01); *C23C 4/105* (2013.01); *C23C 4/11* (2016.01); *C23C 4/12* (2013.01); *C23C 4/127* (2013.01); *C04B 2235/3217* (2013.01); *C04B 2235/3246* (2013.01)

(58) Field of Classification Search
CPC .. C23C 4/11; C23C 4/12; C23C 4/105; C23C 4/127; C04B 35/66; C04B 35/62222; C04B 35/62892; C04B 35/628; C04B 35/626; C04B 2235/3217; C04B 2235/3246

USPC ........... 428/402; 427/453; 106/286.8, 287.26
See application file for complete search history.

(56) References Cited

U.S. PATENT DOCUMENTS

| | | |
|---|---|---|
| 7,115,832 B1 | 10/2006 | Blankenship et al. |
| 2006/0091119 A1 | 5/2006 | Zajchowski et al. |
| 2006/0093748 A1 | 5/2006 | Zajchowski et al. |
| 2007/0023402 A1 | 2/2007 | Zajchowski et al. |
| 2007/0087129 A1 | 4/2007 | Blankenship et al. |
| 2009/0208662 A1 | 8/2009 | Blankenship et al. |
| 2009/0314202 A1 | 12/2009 | Zajchowski et al. |
| 2010/0199494 A1 | 8/2010 | Zajchowski et al. |
| 2011/0237421 A1* | 9/2011 | Burgess ................ B05B 7/205 501/134 |
| 2013/0068729 A1 | 3/2013 | Zajchowski et al. |
| 2013/0098879 A1 | 4/2013 | Zajchowski et al. |

FOREIGN PATENT DOCUMENTS

| | | | |
|---|---|---|---|
| JP | 08-290977 | * | 11/1996 |
| JP | H08-290977 A | | 11/1996 |
| JP | H10-298732 A | | 11/1998 |
| JP | 2002-080954 A | | 3/2002 |
| JP | 2006-131997 A | | 5/2006 |
| JP | 2006-144094 A | | 6/2006 |
| JP | 2010-133021 | * | 6/2010 |
| JP | 2010-133021 A | | 6/2010 |
| JP | 2011-524944 A | | 9/2011 |
| JP | 2012-188677 | * | 10/2012 |
| JP | 2012-188677 A | | 10/2012 |
| KR | 10-2008-0075589 A | | 8/2008 |
| KR | 10020080075589 | * | 8/2008 |

* cited by examiner

*Primary Examiner* — Leszek Kiliman
(74) *Attorney, Agent, or Firm* — Foley & Lardner LLP

(57) ABSTRACT

A thermal spray powder of the present invention contains ceramic particles having an average particle size of 1 μm or more and 20 μm or less. The ceramic particles have a flowability index value FT of 3 or more measured by using a powder rheometer. The flowability index value FF is determined by measuring the maximum principal stress and the uniaxial collapse stress of the ceramic particles at normal temperature and normal humidity when 9 kPa of shear force is applied to the ceramic particles, and by dividing the measured maximum principal stress by the measured uniaxial collapse stress.

12 Claims, No Drawings

POWDER FOR THERMAL SPRAYING, THERMAL SPRAYED COATING, AND METHOD FOR FORMING THERMAL SPRAYED COATING

TECHNICAL FIELD

The present invention relates to a thermal spray powder containing ceramic particles, a thermal spray coating formed by using the thermal spray powder, and a method for forming the thermal spray coating.

BACKGROUND ART

Ceramic thermal spray coatings are used in various applications according to the properties of the constituent ceramics. For example, aluminum oxide thermal spray coatings are used as protective coatings for various members because aluminum oxide exhibits high electric insulation, abrasion resistance, and corrosion resistance. Yttrium oxide thermal spray coatings are used as protective coatings for members in semiconductor device production apparatuses because yttrium oxide exhibits high plasma erosion resistance (see, for example, patent document 1 and patent document 2).

However, due to the fact that a thermal spray coating is intrinsically porous, a ceramic thermal spray coating may be poor in mechanical, electric, or chemical properties as compared with a sintered bulk ceramic. For example, an aluminum oxide thermal spray coating is poor in electric insulation, abrasion resistance, or corrosion resistance as compared with a sintered bulk aluminum oxide. An yttrium oxide thermal spray coating is poor in plasma erosion resistance as compared with a sintered bulk yttrium oxide.

PRIOR ART DOCUMENTS

Patent Documents

Patent document 1: Japanese Laid-Open Patent Publication No. 2002-80954
Patent document 2: Japanese Laid-Open Patent Publication No. 2006-144094

SUMMARY OF THE INVENTION

Problems that are to be Solved by the Invention

In order to form a ceramic thermal spray coating having properties close to the properties of a sintered bulk ceramic, it is effective to use ceramic particles small in particle size. For example, by thermal spraying of ceramic particles having an average particle size of 10 µm or less, dense ceramic thermal spray coatings having a small porosity may be obtained. However, ceramic particles having a small particle size tend to be poor in flowability. In order to design a thermal spray powder having a required flowability, for example, the Carr's flowability index has hitherto been used. The Carr's flowability index is derived from the angle of repose, the degree of compaction, the spatula angle, and the degree of cohesion (or degree of uniformity). However, the inventors of the present invention have discovered that in the case of ceramic particles having an average particle size of 10 µm or less, the correlation between the Carr's flowability index and the actual flowability is poor and it is difficult to design a thermal spray powder so as to have a required flowability.

Accordingly, an objective of the present invention is to provide a thermal spray powder containing ceramic particles designed so as to have a required flowability. Another objective of the present invention is to provide a thermal spray coating formed by using the thermal spray powder and a method for forming the thermal spray coating.

Means for Solving the Problem

In order to achieve the above-described objective and in accordance with an aspect of the present invention, a thermal spray powder is provided that contains ceramic particles having an average particle size of 1 µm or more and 20 µm or less, the ceramic particles have a flowability index value FF of 3 or more measured by using a powder rheometer, wherein the flowability index value FF is determined by measuring the maximum principal stress and the uniaxial collapse stress of the ceramic particles at normal temperature and normal humidity when 9 kPa of shear force is applied to the ceramic particles, and by dividing the measured maximum principal stress by the measured uniaxial collapse stress.

The ceramic particles have a mean fractal dimension of preferably 1.05 or more and 1.7 or less. The ceramic particles may be coated with a polymer. Alternatively, nanoparticles may adhere to the ceramic particle surfaces.

The ceramic particles may contain particles having particle sizes of 20 µm or more and 50 µm or less in a content of 40% by mass or less.

In accordance with another aspect of the present invention, a thermal spray coating is provided that is obtained by thermally spraying the thermal spray powder according to the above-described aspect.

In accordance with yet another aspect of the present invention, a method for forming a thermal spray coating is provided, wherein the thermal spray coating is formed by high velocity flame spraying or plasma spraying of the thermal spray powder according to the above-described aspect.

In the method of the above-described aspect, the thermal spray powder may be fed to a thermal spraying apparatus by an axial feeding method. Alternatively, the thermal spray powder may be fed to the thermal spraying apparatus by using two feeders in such a way that the variation period of the feed rate of the thermal spray powder from one of the feeders is opposite in phase to that from the other feeder. Alternatively, the thermal spray powder delivered from a feeder is temporarily stored in a tank immediately before reaching the thermal spraying apparatus, and the powder in the tank may be fed to the thermal spraying apparatus by utilizing free fall of the thermal spray powder. Alternatively, the thermal spray powder may be fed to the thermal spraying apparatus through an electrically conductive tube. During the thermal spraying, the thermal spray powder may be heated to a temperature of preferably 110% or more of the melting point of the ceramic particles.

MODES FOR CARRYING OUT THE INVENTION

Hereinafter, embodiments of the present invention are described.

A thermal spray powder is used, for example, to form a thermal spray coating. When the thermal spray powder is thermally sprayed to a substrate, a thermal spray coating is formed on the substrate. With respect to the type of the substrate, it does not particularly matter whether the substrate is made of a metal, a ceramic, or any other material.

The thermal spray powder contains ceramic particles. The ceramic particles in the thermal spray powder may be particles made of an oxide ceramics, such as yttrium oxide, aluminum oxide, silicon oxide, titanium oxide, zirconium oxide, yttria-stabilized zirconium oxide, chromium oxide, zinc oxide, mullite, yttrium aluminum garnet (YAG), cordierite, and zircon. Alternatively, the ceramic particles may be particles made of a spinel ceramics; an oxide ceramic containing a rare earth element, such as scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu); or a double oxide ceramic, containing aluminum (Al), silicon (Si), manganese (Mn), or zinc (Zn). Alternatively, the ceramic particles may be particles made of a carbide ceramic, such as boron carbide.

The thermal spray powder may contain a component(s) other than the ceramic particles, but the content of the component(s) is preferably as small as possible. It is preferred that 100% of the thermal spray powder is constituted of ceramic particles.

The average particle size of the ceramic particles in the thermal spray powder is preferably 1 μm or more and more preferably 2 μm or more. In this case, the flowability of the thermal spray powder is improved.

The average particle size of the ceramic particles in the thermal spray powder is preferably 20 μm or less, more preferably 15 μm or less, furthermore preferably 10 μm or less, and most preferably 8 μm or less. In this case, a dense ceramic thermal spray coating is easily obtained.

The ceramic particles in the thermal spray powder have a flowability index value FF of preferably 3 or more measured by using a powder rheometer, such as FT4 manufactured by Malvern Instruments Ltd. The flowability index value FF is determined as follows: a predetermined amount of the ceramic particles is placed in a vessel of, for example, 50 mm in diameter; the maximum principal stress and the uniaxial collapse stress of the ceramic particles in the vessel are measured at normal temperature and normal humidity when 9 kPa of shear force is applied to the ceramic particles; and the measured maximum principal stress is divided by the measured uniaxial collapse stress. The flowability index value FF is not dependent either on the size of the vessel in which the ceramic particles are placed or on the amount of the ceramic particles placed in the vessel. In order to reduce the effects of the temperature and the humidity, the ceramic particles are preferably allowed to stand for 0.5 hour or more before the measurement under the conditions of a temperature of 20° C. and a humidity of 50% RH. When a thermal spray coating is formed by using a thermal spray powder containing ceramic particles having a flowability index value FF of 3 or more, a dense thermal spray coating is easily obtained.

As a method for obtaining ceramic particles having a flowability index value FF of 3 or more, the following methods are effective: a method in which the ceramic particles are coated with a polymer or an organic compound; a method in which nanoparticles are made to adhere to the ceramic particle surfaces; or a method in which a functional group such as a carbonyl group is imparted to the ceramic particle surfaces by using, for example, a silane coupling agent.

The coating of ceramic particles with a polymer or an organic compound can be performed by, for example, a method in which the polymer or the organic compound and the ceramic particles are mixed with water or an organic solvent, and the resulting mixture is dried while the mixture is being dispersed. Alternatively, ceramic particles may be coated with a polymer by mixing the ceramic particles and a fine powder of the polymer in the atmosphere. Examples of the polymer used herein include a nonionic polymer, for example, polyether, such as polyethylene glycol. Examples of the organic compound include cellulose.

The adhesion of nanoparticles to the ceramic particle surfaces can be performed by, for example, mixing the ceramic particles and the nanoparticles with each other. Examples of the nanoparticles used herein include ceramic fine particles and carbon fine particles. The nanoparticles preferably have the same composition as the composition of the ceramic particles in the thermal spray powder. The nanoparticles have an average particle size of preferably 200 nm or less.

The mean fractal dimension of the ceramic particles is preferably 1.05 or more and more preferably 1.2 or more. In this case, when the ceramic particles are coated with a polymer or nanoparticles are made to adhere to the ceramic particle surfaces, the polymer and the nanoparticles tend to adhere to the ceramic particle surfaces, and hence higher flowability is easily achieved. The mean fractal dimension is a value quantifying the degree of irregularities of the ceramic particle surfaces, and has a value falling within a range of 1 or more and less than 2. As the degree of irregularities of the ceramic particle surfaces increases, the mean fractal dimension of the ceramic particles is increased.

The mean fractal dimension of the ceramic particles is also preferably 1.7 or less and more preferably 1.6 or less. In this case, adverse effects of the ceramic particle surface irregularities on the flowability of the ceramic particles are easily reduced.

As long as the average particle size of the ceramic particles falls within a range of 1 μm or more and 20 μm or less, the ceramic particles may contain particles having particle sizes of 20 μm or more and 50 μm or less. In this case, the flowability of the ceramic particles is easily improved. The proportion of particles each having a particle size of 20 μm or more and 50 μm or more that are contained in the ceramic particles is preferably 40% by mass or less.

The ceramic particles can be produced by, for example, the Verneuil method or the melt-crushing method. Alternatively, the ceramic particles may be produced by a solid-phase sintering method, such as a sinter-crushing method and a granulation-sintering method. In the Verneuil method, a raw material powder is melted while being made to fall into an oxyhydrogen flame, and successively crystals are grown to produce ceramic particles. In the melt-crushing method, a raw material powder is melted and solidified by cooling, then crushed, and then classified if necessary, to produce ceramic particles. In the sinter-crushing method, a raw material powder is sintered and crushed, and then classified if necessary, to produce ceramic particles. In the granulation-sintering method, a raw material powder is granulated and sintered, then crushed, and then classified if necessary, to produce ceramic particles. Alternatively, the ceramic particles can be produced by a vapor phase synthesis method. Alternatively, according to a flux method, single crystalline particles can be produced.

The method for thermally spraying the thermal spray powder may be a high velocity flame spraying method, in which the thermal spray powder is fed into the center of the high velocity combustion flame jet flow generated with high-pressure oxygen (or air) and a fuel and is continuously jetted at a high velocity, such as a high velocity oxygen fuel spraying method (HVOF). Alternatively, the method may be a plasma spraying method, in which the thermal spray powder is fed into the center of the plasma jet flow generated from the gas in a plasma form and is jetted, such as an atmospheric-pressure plasma spraying method (APS). The fuel used in the high velocity flame spraying method may be a hydrocarbon gas fuel, such as acetylene, ethylene, propane, and propylene, or a liquid fuel, such as kerosene and ethanol. When the thermal spray powder of the present invention is thermally sprayed by the high velocity flame spraying method or the plasma spraying method, the thermal spray powder small in particle size can be thermally sprayed with a satisfactory flowability, and a dense thermal spray coating can be formed efficiently.

The thermal spray powder is heated during thermal spraying to a temperature of preferably 110% or more of the melting point of the ceramic particles. In this case, the ceramic particles are sufficiently heated during thermal spraying, and hence it becomes easy to obtain a dense thermal spray coating.

The thermal spraying distance, namely, the distance from the tip of the nozzle of the thermal spraying apparatus to the substrate is preferably 30 mm or more. In this case, it becomes easy to suppress thermal alteration or thermal deformation of the substrate.

The thermal spraying distance is also preferably 200 mm or less. In this case, the ceramic particles are sufficiently heated during thermal spraying, and hence it becomes easy to obtain a dense thermal spray coating.

It is preferable to perform the feeding of the thermal spray powder to the thermal spraying apparatus by the axial feeding method, namely, to perform the feeding of the thermal spray powder in the same direction as the axis of the jet flow generated in the thermal spraying apparatus. When the thermal spray powder of the present invention is fed to the thermal spraying apparatus by the axial feeding method, attachment of the ceramic particles in the thermal spray powder is less likely to occur inside the thermal spraying apparatus since the thermal spray powder has good fluidity, and thus a dense thermal spray coating can be formed efficiently.

When the thermal spray powder is fed to the thermal spraying apparatus by using a common feeder, a periodic variation of the feed rate occurs, and hence stable feeding of the powder is difficult. The periodic variation of the feed rate is also referred to as pulsation. When the pulsation increases the feed rate of the thermal spray powder, the ceramic particles are less likely to be uniformly heated in the thermal spraying apparatus, and a nonuniform thermal spray coating is sometimes formed. Accordingly, in order to stably feed the thermal spray powder to the thermal spraying apparatus, a two-stroke method may be adopted, namely, two feeders may be used in such a way that the variation period of the feed rate of the thermal spray powder from one of the feeders is opposite in phase to that from the other feeder. Specifically, the feeding method may be regulated so as to have a period such that when the feed rate from one feeder is increased, the feed rate from the other feeder is decreased. When the thermal spray powder of the present invention is fed to the thermal spraying apparatus by the two-stroke method, a dense thermal spray coating can be formed efficiently since the thermal spray powder has good flowability.

Alternatively, means for stably feeding the thermal spray powder to the thermal spraying apparatus are as follows. That is, a tank may be provided in which the thermal spray powder delivered from the feeder is temporarily stored immediately before the powder reaches the thermal spraying apparatus, and the thermal spray powder in the tank may be fed to the thermal spraying apparatus by utilizing free fall of the powder.

The feeding of the thermal spray powder to the thermal spraying apparatus is performed preferably through an electrically conductive tube made of, for example, a metal. When an electrically conductive tube is used, the occurrence of static electricity is suppressed, and hence the variation of the feed rate of the thermal spray slurry is less likely to occur. The inner surface of the electrically conductive tube has a surface roughness Ra of preferably 0.2 µm or less.

Operation

In the case where the ceramic particles in the thermal spray powder have a flowability index value FF of 3 or more measured by using a powder rheometer, the thermal spray powder can have a required flowability appropriate to satisfactory feeding to the thermal spraying apparatus. In other words, the thermal spray powder can have a required flowability sufficient for forming a thermal spray coating.

Advantageous Effects

Accordingly, according to the present embodiments, a thermal spray powder is provided that is capable of satisfactorily forming a ceramic thermal spray coating.

Modifications

The thermal spray powder may contain two or more types of ceramic particles.

Examples

Next, the present invention is described more specifically with reference to examples and comparative examples.

In each of Examples 1 to 10 and Comparative Examples 1 to 4, a thermal spray powder composed of ceramic particles was prepared. The details of each of the thermal spray powders are shown in Table 1.

TABLE 1

| | Type of ceramic particles | Average particle size of ceramic particles | Mean fractal dimension of ceramic particles | Remark | Flowability index value FF | Deposition property (1) | Deposition property (2) | Coating property (1) | Coating property (2) |
|---|---|---|---|---|---|---|---|---|---|
| Comparative Example 1 | $Al_2O_3$ | 0.15 µm | 1.4 | Adhesion of $Al_2O_3$ nanoparticles | 1.1 | x | x | — | — |

TABLE 1-continued

|  | Type of ceramic particles | Average particle size of ceramic particles | Mean fractal dimension of ceramic particles | Remark | Flowability index value FF | Deposition property (1) | Deposition property (2) | Coating property (1) | Coating property (2) |
|---|---|---|---|---|---|---|---|---|---|
| Comparative Example 2 | $Al_2O_3$ | 3 μm | 1.9 | Adhesion of $Al_2O_3$ nanoparticles | 2.7 | x | x | — | — |
| Example 1 | $Al_2O_3$ | 3 μm | 1.4 | Adhesion of $Al_2O_3$ nanoparticles | 5.7 | ○ | ○ | ○ | ○ |
| Example 2 | $Al_2O_3$ | 6 μm | 1.4 | Adhesion of $Al_2O_3$ nanoparticles | 5.6 | ○ | ○ | ○ | ○ |
| Example 3 | $Y_2O_3$ | 6 μm | 1.4 | Adhesion of $Y_2O_3$ nanoparticles | 4.7 | ○ | ○ | ○ | ○ |
| Example 4 | YSZ | 6 μm | 1.4 | Adhesion of YSZ nanoparticles | 5.1 | ○ | ○ | ○ | ○ |
| Example 5 | $Al_2O_3$ | 18 μm | 1.4 | Granulation-sintering | 8.3 | ○ | ○ | ○ | ○ |
| Comparative Example 3 | $Al_2O_3$ | 25 μm | 1.4 | Granulation-sintering | 8.3 | ○ | ○ | x | x |
| Example 6 | $Al_2O_3$ | 3 μm | 1.4 | Coating with PEG | 5.4 | ○ | ○ | ○ | ○ |
| Example 7 | $Al_2O_3$ | 3 μm | 1.4 | Mixing of $Al_2O_3$ coarse particles | 7.2 | ○ | ○ | ○ | ○ |
| Example 8 | $Al_2O_3$ | 2 μm | 1.4 | Coating with PEG, and adhesion of $Al_2O_3$ nanoparticles | 5.4 | ○ | ○ | ○ | ○ |
| Comparative Example 4 | $Al_2O_3$ | 3 μm | 1.03 | Adhesion of $Al_2O_3$ nanoparticles | 2.9 | x | x | — | — |
| Example 9 | (La—Yb—Al—Si—Zn)O | 2 μm | 1.5 | Adhesion of $Al_2O_3$ nanoparticles | 3.6 | ○ | ○ | ○ | ○ |
| Example 10 | (La—Al—Si—Ca—Na—P—F—B)O | 5 μm | 1.5 | Adhesion of $Al_2O_3$ nanoparticles | 4.3 | ○ | ○ | ○ | ○ |

The column "Type of ceramic particles" in Table 1 shows the type of the ceramic particles used in each of the thermal spray powders. In the same column, "$Al_2O_3$" represents aluminum oxide, "$Y_2O_3$" represents yttrium oxide, "YSZ" represents yttria-stabilized zirconium oxide, "(La—Yb—Al—Si—Zn)O" represents a double oxide ceramic containing lanthanum, ytterbium, aluminum, silicon, and zinc, and "(La—Al—Si—Ca—Na—P—F—B)O" represents a double oxide ceramic containing lanthanum, aluminum, silicon, calcium, sodium, phosphorus, fluorine, and boron.

The column "Average particle size of ceramic particles" in Table 1 shows the average particle size of the ceramic particles used in each of the thermal spray powders. The average particle size was calculated from the specific surface areas of the ceramic particles measured by using the specific surface area measurement apparatus "Flow Sorb II 2300", manufactured by Micromeritics Corp.

The column "Mean fractal dimension of ceramic particles" in Table 1 shows the result of measuring the mean fractal dimension of the ceramic particles used in each of the thermal spray powders. The measurement of the mean fractal dimension was performed by a divider method using the image analysis software Image-Pro Plus, produced by Nippon Roper K.K., on the basis of the secondary electron images (at 1,000- to 2,000-fold magnification), obtained by using a scanning electron microscope, of five particles each having a particle size of the average particle size ±3 μm of the ceramic particles in each of the thermal spray powders.

In the column "Remark" shown in Table 1, "Adhesion of $Al_2O_3$ nanoparticles" means that aluminum oxide nanoparticles having an average particle size of 0.1 μm adhere to the ceramic particle surfaces, and the content of the aluminum oxide nanoparticles in the thermal spray powder is 0.5% by mass. "Adhesion of $Y_2O_3$ nanoparticles" means that yttrium oxide nanoparticles having an average particle size of 0.1 μm adhere to the ceramic particle surfaces, and the content of the yttrium oxide nanoparticles in the thermal spray powder is 0.5% by mass. "Adhesion of YSZ nanoparticles" means that yttria-stabilized zirconium oxide nanoparticles having an average particle size of 0.1 μm adhere to the ceramic particle surfaces, and the content of the yttria-stabilized zirconium oxide nanoparticles in the thermal spray powder is 0.5% by mass. "Granulation-sintering" means that the ceramic particles were produced by the granulation-sintering method. "Coating with PEG" means that the ceramic particles are coated with polyethylene glycol. "Inclusion of $Al_2O_3$ coarse particles" means that aluminum oxide coarse particles having a particle size of 30 μm are mixed with the ceramic particles, and the content of the aluminum oxide coarse particles in the thermal spray powder is 20% by mass.

The column "Flowability index value FF" in Table 1 shows the result of measuring, by using a powder rheometer, the flowability index value FF of the ceramic particles used in each of the thermal spray powders.

The column "Deposition property (1)" in Table 1 shows the result of evaluating whether or not a thermal spray coating was able to be obtained when each of the thermal spray powders was atmospheric plasma sprayed under the conditions described in Table 2. In the same column, "○ (good)" represents the case where the thickness of the thermal spray coating formed per one pass was 3 μm or more, and "x (poor)" represents the case where the thickness concerned was less than 3 μm. It is to be noted that one pass means one time of thermal spraying operation performed by the thermal spraying apparatus (thermal spraying gun) along the traveling direction of the thermal spraying apparatus or the object of the thermal spraying (substrate).

The column "Deposition property (2)" in Table 1 shows the result of evaluating whether or not a thermal spray coating was able to be obtained when each of the thermal spray powders was HVOF sprayed under the conditions described in Table 3. In the same column, "○ (good)" represents the case where the thickness of the thermal spray coating formed per one pass was 3 μm or more, and "x (poor)" represents the case where the thickness concerned was less than 3 μm.

The column "Coating property (1)" in Table 1 shows the result of evaluating the porosity of the thermal spray coating obtained by atmospheric plasma spraying of each of the thermal spray powders under the conditions described in Table 2. The measurement of the porosity was performed as follows. Specifically, the cross section of a thermal spray coating was polished with the coating resin-embedded, and then the cross-sectional image was photographed by using the digital microscope VC-7700, manufactured by OMRON Corp. Subsequently, by the image analysis with the image analysis software ImagePro, produced by Nippon Roper K.K., the pore areas were identified in the cross-sectional image, and the proportion of the pore areas in the cross-sectional image was determined. In the column "Coating property (1)," "○ (good)" indicates that the measured porosity of the thermal spray coating was 10% or less, "× (poor)" indicates that the measured porosity exceeded 10%, and "–" indicates that no test was performed.

The column "Coating property (2)" in Table 1 shows the result of evaluating the porosity of the thermal spray coating obtained by HVOF spraying of each of the thermal spray powders under the conditions described in Table 3. In the same column, "○ (good)" indicates that the porosity of the thermal spray coating measured by the same method as described above was 10% or less, "× (poor)" indicates that the porosity of the thermal spray coating measured by the same method as described above exceeded 10%, and "–" indicates that no test was performed.

TABLE 2

Thermal spraying apparatus: "SG-100", manufactured by Praxair Surface Technologies, Inc.
Powder feeder: "AM-30", manufactured by Technoserve Co., Ltd.
Ar gas pressure: 50 psi (0.34 MPa)
He gas pressure: 50 psi (0.34 MPa)
Voltage: 37.0 V
Current: 900 A
Thermal spraying distance: 120 mm
Traveling speed of thermal spraying apparatus: 24 m/min
Feed rate of thermal spray powder: 20 g/min

TABLE 3

Thermal spraying apparatus: "Top gun", manufactured by GTV GmbH
Powder feeder: Manufactured by GTV GmbH
Acetylene gas flow rate: 75 L/min
Oxygen gas flow rate: 230 L/min
Thermal spraying distance: 200 mm
Traveling speed of thermal spraying apparatus: 50 m/min
Feed rate of thermal spray powder: 40 g/min As shown in Table 1, in the case of the thermal spray powder of each of Examples 1 to 10, the evaluation results regarding the deposition properties were good. The thermal spray coating obtained from the thermal spray powder of each of Examples 1 to 10 was high in the degree of denseness in such a way that the porosity was 10% or less.

The invention claimed is:

1. A thermal spray powder comprising ceramic particles having an average particle size of 1 μm or more and 20 μm or less,
   wherein the ceramic particles have a flowability index value FF of 3 or more measured by using a powder rheometer, the flowability index value FF being determined by measuring a maximum principal stress and a uniaxial collapse stress of the ceramic particles at normal temperature and normal humidity when 9 kPa of shear force is applied to the ceramic particles, and by dividing the measured maximum principal stress by the measured uniaxial collapse stress, and
   wherein the ceramic particles have a mean fractal dimension of 1.2 or more and 1.7 or less.

2. The thermal spray powder according to claim 1, wherein the ceramic particles are coated with a polymer.

3. The thermal spray powder according to claim 1, wherein the each of the ceramic particles has a surface, and nanoparticles adhere to the ceramic particle surfaces.

4. The thermal spray powder according to claim 1, wherein the ceramic particles contain particles having particle sizes of 20 μm or more and 50 μm or less in a content of 40% by mass or less.

5. A thermal spray coating obtained by thermally spraying the thermal spray powder according to claim 1.

6. A method for forming a thermal spray coating, comprising high velocity flame spraying or plasma spraying the thermal spray powder according to claim 1.

7. The method for forming a thermal spray coating according to claim 6, further comprising feeding the thermal spray powder to a thermal spraying apparatus by an axial feeding method.

8. The method for forming a thermal spray coating according to claim 6, further comprising feeding the thermal spray powder to a thermal spraying apparatus by using two feeders in such a way that the variation period of the feed rate of the thermal spray powder from one of the feeders is opposite in phase to that from the other feeder.

9. The method for forming a thermal spray coating according to claim 6, further comprising:
   temporarily storing the thermal spray powder delivered from a feeder in a tank immediately before reaching a thermal spraying apparatus; and
   feeding the thermal spray powder in the tank to the thermal spraying apparatus by utilizing free fall of the thermal spray powder.

10. The method for forming a thermal spray coating according to claim 6, further comprising feeding the thermal spray powder to a thermal spraying apparatus through an electrically conductive tube.

11. The method for forming a thermal spray coating according to claim 6, further comprising heating, during said spraying, the thermal spray powder to a temperature of 110% or more of the melting point of the ceramic particles.

12. The thermal spray powder according to claim 1, wherein the ceramic particles are oxide ceramic particles.

* * * * *